US 8,827,466 B2

(12) United States Patent
Schmierer et al.

(10) Patent No.: US 8,827,466 B2
(45) Date of Patent: Sep. 9, 2014

(54) EXTERIOR REAR VIEW MIRROR WITH AIR FLOW

(75) Inventors: Arne Schmierer, Kirchheim (DE); Raimund Negel, Unterensingen (DE); Andreas Herrmann, Winnenden-Baach (DE); Istvan Szmolenszki, Schwaikheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 420 days.

(21) Appl. No.: 13/152,950

(22) Filed: Jun. 3, 2011

(65) Prior Publication Data
US 2011/0299182 A1 Dec. 8, 2011

(30) Foreign Application Priority Data

Jun. 4, 2010 (EP) ..................... 10164964

(51) Int. Cl.
*G02B 5/08* (2006.01)
*B60R 1/06* (2006.01)
(52) U.S. Cl.
CPC ........................... *B60R 1/06* (2013.01)
USPC ............................ 359/841; 701/49
(58) Field of Classification Search
CPC ........... B60R 1/025; B60R 1/02; B60R 1/07; B60N 2/0248; B60N 2/0244; B60N 2/0232
USPC .............. 359/841, 871–877; 701/49
See application file for complete search history.

(56) References Cited

U.S. PATENT DOCUMENTS

| 5,179,470 A * | 1/1993 | Olson ........................... 359/509 |
| 2008/0310040 A1* | 12/2008 | Suzuki et al. ................. 359/873 |
| 2010/0202074 A1 | 8/2010 | Tilg et al. |

FOREIGN PATENT DOCUMENTS

| DE | 19632620 | 1/1998 |
| DE | 19743107 | 4/1999 |
| DE | 10351857 | 6/2005 |
| DE | 102005047189 | 4/2007 |

OTHER PUBLICATIONS

European Search Report for application No. EP 10 16 4964 dated Nov. 5, 2010.

* cited by examiner

*Primary Examiner* — Jennifer L. Doak
(74) *Attorney, Agent, or Firm* — Reising Ethington PC

(57) ABSTRACT

An exterior rear view mirror housing, which consists of at least a first housing part and a second housing part, and which comprises an opening on its rear side for a mirror glass, whereby the second housing part contains the walls surrounding the opening. The first housing part and at least one of the walls of the second housing part surrounding the opening comprise inner surfaces which face each other oppositely. On at least one of the inner surfaces which face each other oppositely, at least one ridge is arranged, which runs parallel to the rear side and extends from the one inner surface up to a remaining clearance to the opposing inner surface.

12 Claims, 2 Drawing Sheets

EXTERIOR REAR VIEW MIRROR WITH AIR FLOW

The invention is based on a priority patent application EP 10164964.8 which is hereby incorporated by reference.

BACKGROUND ART

1. Field of the Invention

The invention relates to an exterior rear view mirror housing with several housing parts, an exterior rear view mirror as well as an exterior rear view mirror configuration in which the housing parts contain the mirror glass.

2. Description of the Related Art

An exterior rear view mirror configuration for a motor vehicle consists, for example, of a mirror foot arranged on the motor vehicle, which can be covered by a mirror foot cover, and an exterior rear view mirror arranged on the mirror foot. The mirror foot can be produced as a die-cast piece, for example, from a material which is resistant to the forces and moments which occur. The exterior rear view mirror comprises an exterior rear view mirror housing, which, among others, accommodates a base support assigned to the mirror foot.

The mirror foot and the base support are hinged together, so that the exterior rear view mirror can be pivoted about a hinge axis towards the mirror foot from an operating position to a folding point and vice versa. In this process, bearing means can be provided between the mirror foot and the base support, in order to keep wear and tear and frictional forces arising during movement as low as possible.

Preferably, the base support is also produced as a die-cast part from a material resistant to arising forces and moments, for example, from the same material as the mirror foot. An adjusting device for a mirror glass, driven by an electric motor, for example, is arranged on the mirror foot. The adjusting device acts on a carrier plate, on which the mirror glass is arranged. The mirror glass can be mounted onto the carrier plate by means of an adhesive connection, for example. The carrier plate can be guided to and/or mounted on the adjustment device and/or the base plate.

On its rear side, facing away from the direction of movement of the motor vehicle in the operating position, the exterior rear view mirror housing comprises an opening, through which the mirror glass is visible, or in which the mirror glass is arranged. In order to ensure that the mirror glass is adjustable, a distance is kept on all sides between the mirror glass or carrier plate and the walls of the exterior rear view mirror housing surrounding the opening, so that a clearance is given around the mirror glass between the walls of the exterior rear view mirror housing surrounding the opening.

In addition, the exterior rear view mirror can comprise a repeated flashing light, a module for a driving assistance device, such as blind spot monitoring, a lane departure warning, approach monitoring, or similar, or a combination thereof. Alternatively or additionally, the exterior rear view mirror can also comprise sensors for recording driving and/or surrounding conditions, such as for example, temperature, brightness, degree of pollution, lighting situation, for example, in order to automatically heat the mirror glass, or to dim electro-chromatically, for example.

For example, in order to facilitate assembly of the different component parts housed inside the exterior rear view mirror housing, as well as, if necessary, their electrical connections to each other in an exterior rear view mirror of this type, the exterior rear view mirror housing is formed in at least two parts. A first housing part forms the housing base, for example, with a second housing part forming the housing cover, for example. One of both housing parts contains the housing section lying around the opening for the mirror glass, with the walls encompassing the opening.

A generally known and as yet unresolved problem of exterior rear view mirrors of this type is noise generation at high speeds.

An exterior rear view mirror is known in DE 103 51 857 A1, in which a protrusion is provided for reduction of noise generation. The protrusion is arranged in the area of the outer surface of the exterior rear view mirror housing, in which, the exterior flow is slowed down during inflow in the direction of travel, and after a previous decrease of pressure, a pressure increase ensues in the boundary layer. A laminar-turbulent transition of the boundary layer is enforced by the protrusion. The boundary layer, turbulent after the change, has a stronger exchange with the exterior flow than a laminar boundary layer.

Therefore, the turbulent boundary layer can follow a pressure increase for longer without displacement, and more easily than the laminar boundary layer. Furthermore, the separation bubble occurring on the rear side at high speeds is reduced, which therefore also reduces the trail. Both effects can contribute to a reduction in noise generation. The disadvantage of this is that, in comparison to the laminar boundary layer, the turbulent boundary layer has a greater thickness, connected to greater air resistance.

In DE 196 32 620 C1, an exterior rear view mirror is known, which is permeated by air ducts for reduction of noise generation, which are connected to an air source. The air ducts end on the rear side of the exterior rear view mirror housing. With this procedure, air should be supplied to the separation bubble which occurs on the rear side at high speeds, whereby the pressure in the separation bubble should be raised. Due to the raised pressure in the separation bubble, the trail of the exterior rear view mirror is reduced, synonymous with a reduced degree of turbulence in the trail. The disadvantage of this is the danger of additional, speed-dependent noise generation of the air ducts, for example, whistling noises.

An exterior rear view mirror is known in DE 197 43 107 C2, on which exterior rear view mirror housing, seen from the underside of the front stagnation point, before the transition or the edge to the rear side comprising the opening for the mirror glass, a tear-off edge is formed. This should prevent soiling of the mirror glass by spray water.

SUMMARY OF THE INVENTION

An object of the invention is to provide an exterior rear view mirror housing as well as an exterior rear view mirror and an exterior rear view mirror configuration with reduced noise generation.

The object is achieved by an exterior rear view mirror with housing parts, which comprise at least one ridge in the edge region, belonging to the wall surrounding the mirror glass.

Accordingly, a first item of the invention concerns an exterior rear view mirror housing of an exterior rear view mirror of an exterior rear view mirror configuration for a motor vehicle, with the exterior rear view mirror housing formed in at least two parts, and consisting of at least a first housing part and a second housing part. The first housing part and the second housing part border each other along at least one connecting joint. The exterior rear view mirror housing comprises an opening for a mirror glass on its rear side, turned away from the direction of movement of the motor vehicle.

The second housing part comprises a housing section lying around the opening for the mirror glass, with the walls surrounding the opening.

The first housing part and at least one of the walls of the second housing part surrounding the opening comprise opposing inner surfaces facing each other, facing a housing interior. On at least one of the opposing inner surfaces which face each other, at least one ridge is arranged, which runs parallel to the rear side and extends freely out into the housing interior, from the inner surface up to a remaining clearance, approaching the opposing inner surface. In this process, the at least one ridge stemming from the inner surface comes closer to the clearance of the opposing inner surface. The at least one ridge can be formed, for example, as an integral component of the first or second housing part, preferably made in an injection moulding procedure.

It is important to mention that the expressions first and second housing part, as well as the terms first and second do not denote an order or concrete instructions for assembly, but simply serve for differentiation and are interchangeable.

According to the invention, it is intended that in the region of the walls surrounding the opening, at least one ridge is arranged on at least one of the opposing inner surfaces, which face each other, of the first and/or second housing part.

Amongst others, advantages of the invention in comparison to the prior art are given in that the at least one ridge forms a labyrinth seal, through which noise generation is reduced or prevented, which occurs, amongst others, during inflow of the exterior rear view mirror housing from the front side opposing the rear side, air is sucked from the boundary layer via the connecting joint between the first and second housing part via the clearance between the mirror glass, and the walls of the opening surrounding this, by the negative pressure in the separation bubble on the rear side. In the prior art, in the described way, undesired noise is generated by air flowing freely through an exterior rear view mirror housing. Thus the at least one ridge prevents noise generation, for example, whistling noises, which originate from undesired flow through the exterior rear view mirror housing. The at least one ridge serves for targeted air flow when air flows over the exterior rear view mirror.

Amongst others, further advantages are given in that there is no contact between the ridge and the opposing inner surface, and therefore there are no vibration noises or creaking or squeaking noises which possibly occur due to vibrations or relative motions of the housing parts in relation to each other, as a small clearance is kept between the inner surfaces. Due to this clearance being kept, assembly is also made easier, since in comparison to a ridge reaching the opposing inner surface e.g. an excess of ridge does not lead directly to a failure but first of all simply leads to a tapering of the clearance.

A further advantage is given by a hardening of the corresponding housing parts by at least one ridge, whereby noises caused by the housing vibrations induced by the flows around can be prevented.

At least one ridge is preferably arranged on the first housing part. The at least one ridge thus extends at least over at least one section of the first housing part opposing the walls surrounding the opening. Since the first housing part is provided with at least one ridge, the additional advantage of a hardening of the first housing part in at least one area opposing the wall surrounding the opening is achieved. Therefore vibrations of the first housing part which generate noises cannot occur at all, or are effectively suppressed.

A flow with increased pressure in the boundary layer can flow around the first housing part on one external wall assigned to an inner surface strengthened with at least one ridge. For example, protrusions or at least one tear-off edge are provided on the first housing part, in order to influence the flow for reduction of noise generation. Through this, depending on the speed of the vehicle, there can be a dynamic stress of the first housing part, caused by turbulences in the boundary layer along the external wall and/or exterior flow. The at least one ridge effectively strengthens the housing part, so that the dynamic stress cannot cause any oscillation or vibration of the first housing part. Therefore noise generation is more effectively avoided or prevented.

An advantageous embodiment of the invention provides several staggered ridges which are arranged parallel to each other.

For example, adjacent, staggered ridges, which are parallel to each other, can be arranged on the opposite-facing inner surfaces. In each case here, at least one ridge is arranged staggered on the inner surfaces which are opposite to each other. For one thing, this thus results in an improved sealing effect of the labyrinth seal formed by the ridges, and for another, in a hardening of both housing sections of the first and second housing part comprising the inner surfaces opposing each other.

The exterior rear view mirror housing may including a repeating flashing light. Alternatively or additionally, the exterior rear view mirror housing can house a module and/or a sensor for a driving assistance device and/or for control of a vehicle function, such as for example, control of heating and/or automatic dimming of the mirror glass. The module and/or sensor for a driving assistance device can be a display device for blind spot monitoring, a lane departure warning or approach monitoring, a receiver for satellite based positioning or similar, or a combination thereof. The control of a vehicle function can concern, for example, heating and/or automatic dimming of the mirror glass. Hereto, the exterior rear view mirror housing can comprise a temperature sensor and/or a brightness sensor.

The first housing part preferably forms or contains a housing base, whereas the second housing part forms or contains a housing cover.

On the first housing part and/or on the second housing part, seen in the case of inflow from a front side, facing away from the rear side, of the exterior rear view mirror housing, seen from the front stagnation point, before the transition or the edge to the rear side comprising the opening for the mirror glass, a tear-off edge can be formed. Through this, in addition to a reduction of noise generation by a reduction of the trail, soiling of the mirror glass can be counteracted.

Alternatively or additionally, in at least one area of the external surface of the exterior rear view mirror housing, at least one protrusion can be provided, in which area, seen in the case of inflow from a front side of the exterior rear view mirror housing turned away from the rear side, the exterior flow is reduced, and after the previous pressure decrease, a pressure increases ensues in the boundary layer. An additional reduction of noise generation is achieved by the reduction of the trail.

Between the opposing inner surfaces which face each other, at least one seal made of a reversible, elastically deformable material, e.g. an elastomer material, can be implemented, which further improves the sealing effect of the ridge. In contrast to an exclusive arrangement of an elastomer seal, for example, the at least one ridge e.g. a flap of the seal prevents a pressure difference to be withstood which is higher than this. Therefore the at least one ridge according to the invention, also in combination with an elastomer seal, contributes to a reduction of undesired noise generation.

A second item of the invention concerns an exterior rear view mirror comprising an exterior rear view mirror housing, which accommodates a base support assigned to a mirror foot arranged on the motor vehicle. The exterior rear view mirror is characterized by a previously described exterior rear view mirror housing.

A third item of the invention concerns an exterior rear view mirror configuration for a motor vehicle, comprising a mirror foot arranged on the motor vehicle, the mirror foot being covered with a mirror foot cover, if necessary, and an exterior rear view mirror arranged on the mirror foot. The exterior rear view mirror concerns a previously described exterior rear view mirror.

Further features of the invention result from the further claims, description and drawings.

BRIEF DESCRIPTION OF THE DRAWINGS

Embodiments of the invention are subsequently explained in more detail by means of the drawings. Identical reference numbers here denote identical or identically working elements.

DETAILED DESCRIPTION OF THE DRAWINGS

Figure 1:
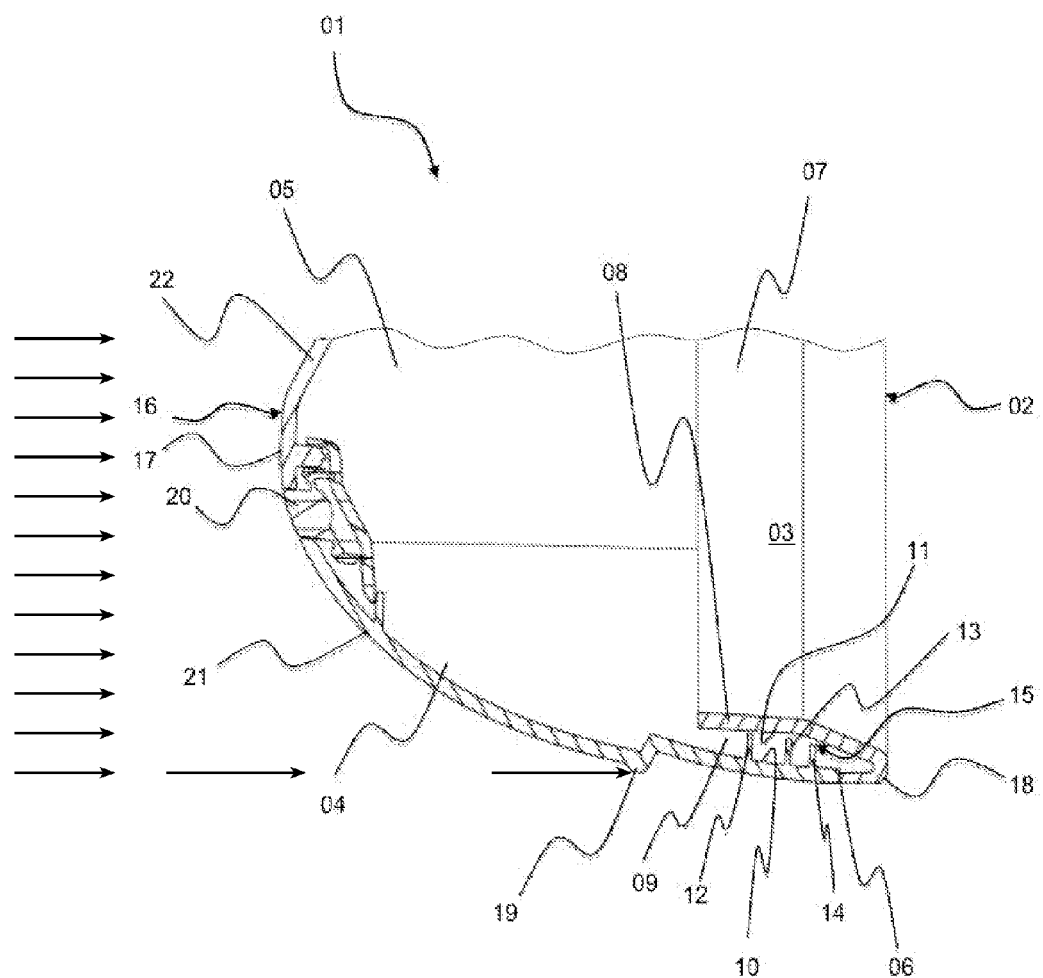
FIG. 1 is a schematic representation of a cross-section through a part of an exterior rear view mirror housing.

An exterior rear view mirror housing 01 partly shown in FIG. 1 of an exterior rear view mirror of an exterior rear view mirror configuration for a motor vehicle comprises an opening 03 for a mirror glass, not shown, on its rear side 02, "rear" with respect to being turned away from the direction of travel of the motor vehicle. The exterior rear view mirror housing 01 is formed in at least two parts. The exterior rear view mirror housing 01 consists of at least a first housing part 04 and a second housing part 05. The first housing part 04 and the second housing part 05 border each other at least in an area near to the rear side 02 along at least one connecting joint 06. The second housing part 05 contains a housing section 07 surrounding the opening 03 for the mirror glass, with the walls 08 surrounding the opening 03.

The first housing part 04 and at least one of the walls 08 of the second housing part 05 surrounding the opening 03 comprise inner surfaces 10, 11 facing opposite to each other, facing a housing interior 09. The wall 8 is formed as a mirror frame for the mirror glass.

On at least one of the inner surfaces 10, 11 facing opposite to each other, at least one ridge 12, 13, 14 is arranged, which runs parallel to the rear side 02 and extends freely out from one inner surface 10, 11 up to a remaining clearance 15, approaching the opposing inner surface 11, 10, into the housing interior 09. Thereby, the at least one ridge 12, 13, 14 can stand vertically or at any angle on the corresponding inner surface 10, 11. Changing the angle between the inner surface 10, 11 and each standing ridge 12, 13, 14 is also possible. The at least one ridge 12, 13, 14 is preferably formed as an integral component, for example, of the first housing part 04. At least one ridge 12, 13, 14 extends parallel to the rear side over the inner surface 10, 11 of the whole area, in which the inner surface 11 lies opposite at least one wall 08 of the inner surface 10 of the first housing part 04.

Preferably, several ridges 12, 13, 14 are provided, which are staggered and arranged parallel to one another. In this process, adjacent, staggered ridges 12, 13, 14 which are parallel to each other can be arranged alternately on the opposing inner surface 10, 11.

On the first housing part 04 and/or on the second housing part 05, seen in the case of inflow from a front side 16, facing away from the rear side 02, of the exterior rear view mirror housing 01, seen from the front stagnation point 17, before the transition or the edge 18 to the rear side 02 comprising the opening 03 for the mirror glass, a tear-off edge 19 can be formed. In addition to a reduction of noise generation by a reduction of the trail, the tear-off edge 19 contributes to a reduction in soiling of the mirror glass.

The exterior rear view mirror housing 01 can house a repeated flashing light 20. The first housing part 04 preferably forms or contains a housing base 21, whereas the second housing part 05 forms or contains a housing cover 22.

Figure 2:
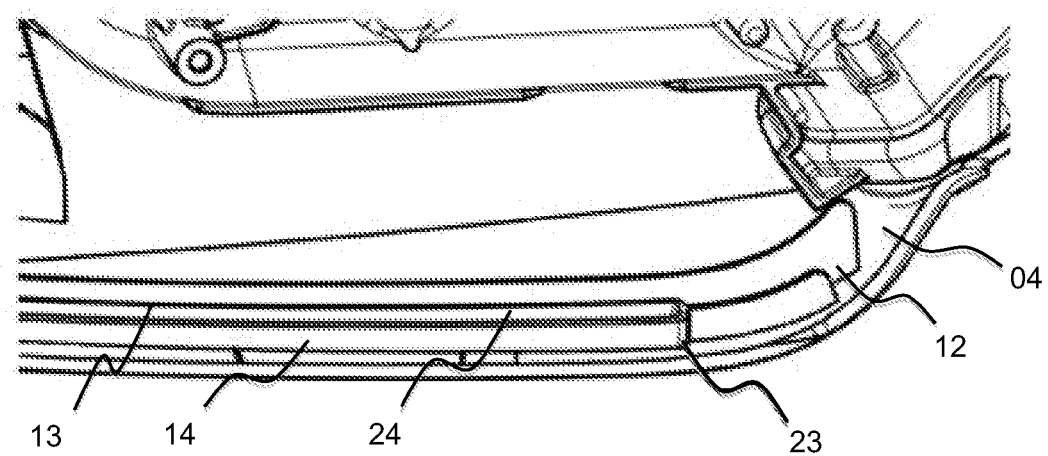
FIG. 2 is a view of the lower housing part.

FIG. 2 shows a view of the lower housing part 04. Ridges 12, 13, 14 are attached along the edge extending along the longitudinal axis of the mirror. Both of the external ridges 13 and 14 form an interior space 24, which ends at point 23. At this point, both ridges 13 and 14 run together and run as a common ridge in the direction of the mirror foot. The ridges become continually higher towards their ends. Therefore the function is also fulfilled in the critical area near to the vehicle.

The embodiment with the two converging ridges furthermore fulfils the requirement, if necessary, of forming the receiving space 24 for a seal.

The invention is particularly industrially applicable in the fields of manufacturing exterior rear view mirror housings, exterior rear view mirrors and exterior rear view mirror configurations for motor vehicles.

LIST OF REFERENCE NUMERALS

01 Exterior rear view mirror housing
02 Rear side
03 Opening
04 First housing part
05 Second housing part
06 Connecting joint
07 Housing section
08 Wall
09 Housing interior
10 Inner surface
11 Inner surface
12 Ridge
13 Ridge
14 Ridge
15 Clearance
16 Front side
17 Front stagnation point
18 Edge
19 Tear-off edge
20 Repeated flashing light
21 Housing base
22 Housing cover
23 Point of connection
24 Space

We claim:

1. An exterior rear view mirror assembly for a motor vehicle, said exterior rear view mirror assembly comprising:
a first housing part having a first inner surface;
a second housing part fixedly secured to said first housing part and having a second inner surface,
whereby
said first and second housing parts create a housing that defines an opening on a rear side for a mirror glass, said second housing part includes a wall surrounding said opening and includes said second inner surface, said first and second inner surfaces are opposing each other and forming a rim such that said inner surfaces face each other and the interior of the housing; and a plurality of ridges being arranged within the rim to reduce noise created by wind entering the housing, whereby each of said plurality of ridges extend from one of said inner surfaces toward the other of said opposing inner surfaces with said plurality of ridges extending from one of said inner surfaces to an end spaced from the other of said inner surfaces defining a clearance, wherein said clearance of at least one of said plurality of ridges decreases as a linear distance along said at least one of said plurality of ridges with respect to the motor vehicle decreases.

2. An exterior rear view mirror assembly according to claim 1, wherein said at least one of said plurality of ridges extends out from said first housing part.

3. An exterior rear view mirror assembly according to claim 1 wherein each of said plurality of ridges is staggered and parallel to one another.

4. An exterior rear view mirror assembly according to claim 3 wherein each of said plurality of ridges extends alternately from each of said opposite-facing inner surfaces.

5. An exterior rear view mirror assembly according to claim 3, wherein each of said plurality of ridges is spaced equidistantly from each other.

6. An exterior rear view mirror assembly according to claim 3, wherein each of said plurality of ridges is spaced non-uniformly from each other.

7. An exterior rear view mirror assembly according to claim 3, wherein two adjacent of said plurality of ridges form a receiving space.

8. An exterior rear view mirror assembly according to claim 3, wherein said housing houses a module for an electronic device.

9. An exterior rear view mirror assembly according to claim 1, wherein said first housing part comprises a housing base and said second housing part comprises a housing cover.

10. An exterior rear view mirror assembly according claim 1, wherein a tear-off edge is formed on said first housing part and/or on the second housing part, seen in the case of inflow from a front side, turned away from a rear side, of said exterior rear view mirror assembly, seen from the front stagnation point, before the transition to the rear side.

11. An exterior rear view mirror assembly according to claim 10, wherein at least one protrusion is arranged in at least one region of the outer surface of the housing of the external rear view mirror assembly, in which region, when there is a flow as viewed from a front of the housing of the external rear view mirror assembly, the external flow is retarded and the pressure increases in a boundary layer after a previous decrease of pressure, said front facing away from the rear side.

12. An exterior rear view mirror assembly comprising:

an exterior rear view mirror housing having at least one base support assigned to a mirror foot arranged on a motor vehicle;

said exterior rear view mirror housing including a first housing part and a second housing part, defining an opening on a rear side for a mirror glass, whereby said second housing part contains walls surrounding said opening, whereby said first housing part and at least one of said walls of said second housing part surrounding the opening and include opposing inner surfaces facing each other and an interior of said exterior rear view mirror housing, whereby a plurality of ridges being arranged within the rim to reduce noise created by wind entering the housing, whereby said plurality of ridges extends from one of said opposing inner surfaces toward the other of said opposing inner surfaces with said plurality of ridges running parallel to a rear side and extending from said one inner surface toward said opposite-facing inner surface defining a clearance, wherein said clearance diminishes the closer said plurality of ridges is to the mirror foot.

* * * * *